July 12, 1927.

H. S. LEE

MOLDING APPARATUS

Filed Jan. 26, 1925

INVENTOR.
Harry S. Lee
BY Stuart C. Barnes
ATTORNEY.

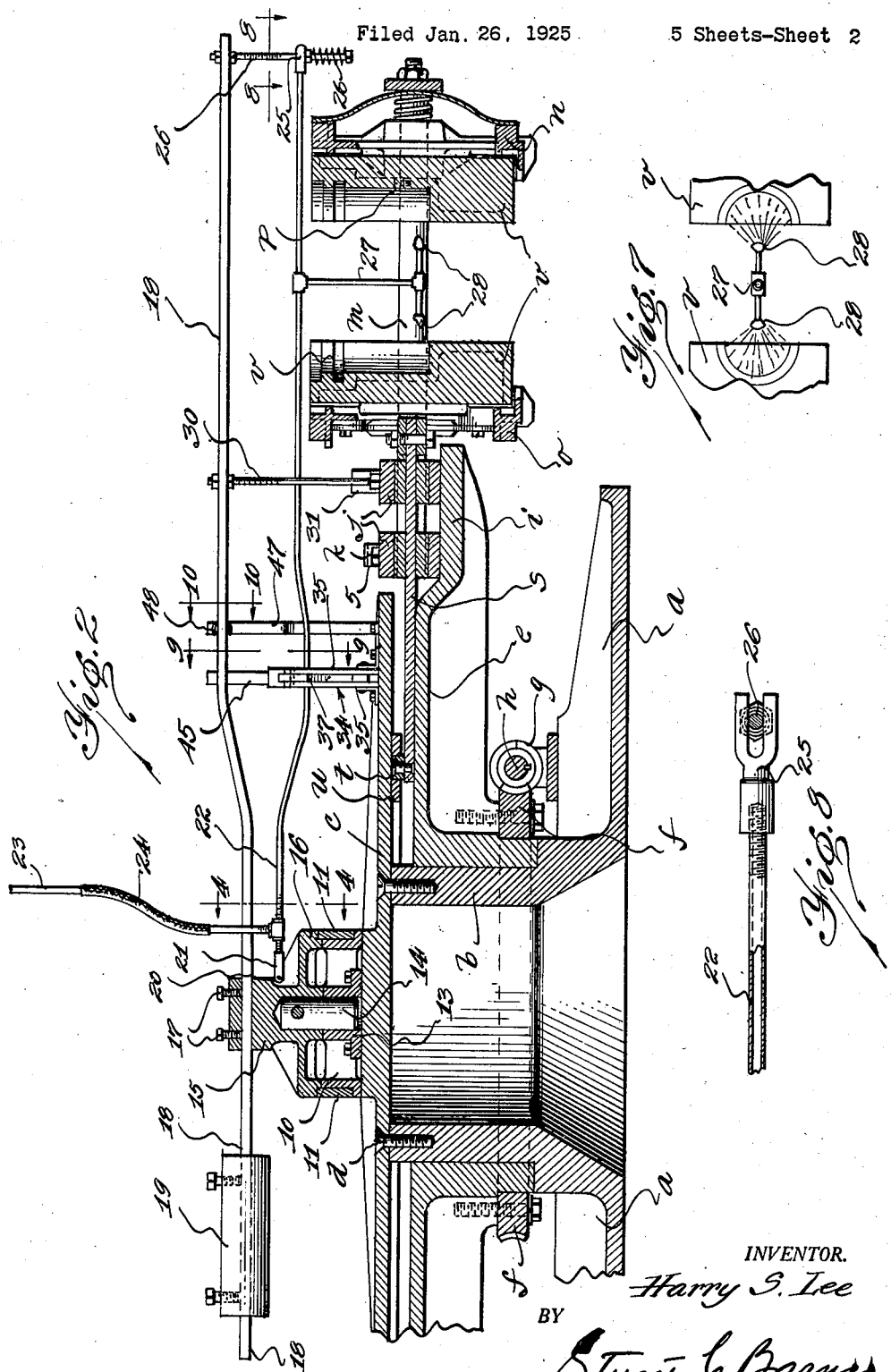

July 12, 1927.
H. S. LEE
MOLDING APPARATUS
Filed Jan. 26, 1925
1,635,369
5 Sheets-Sheet 3
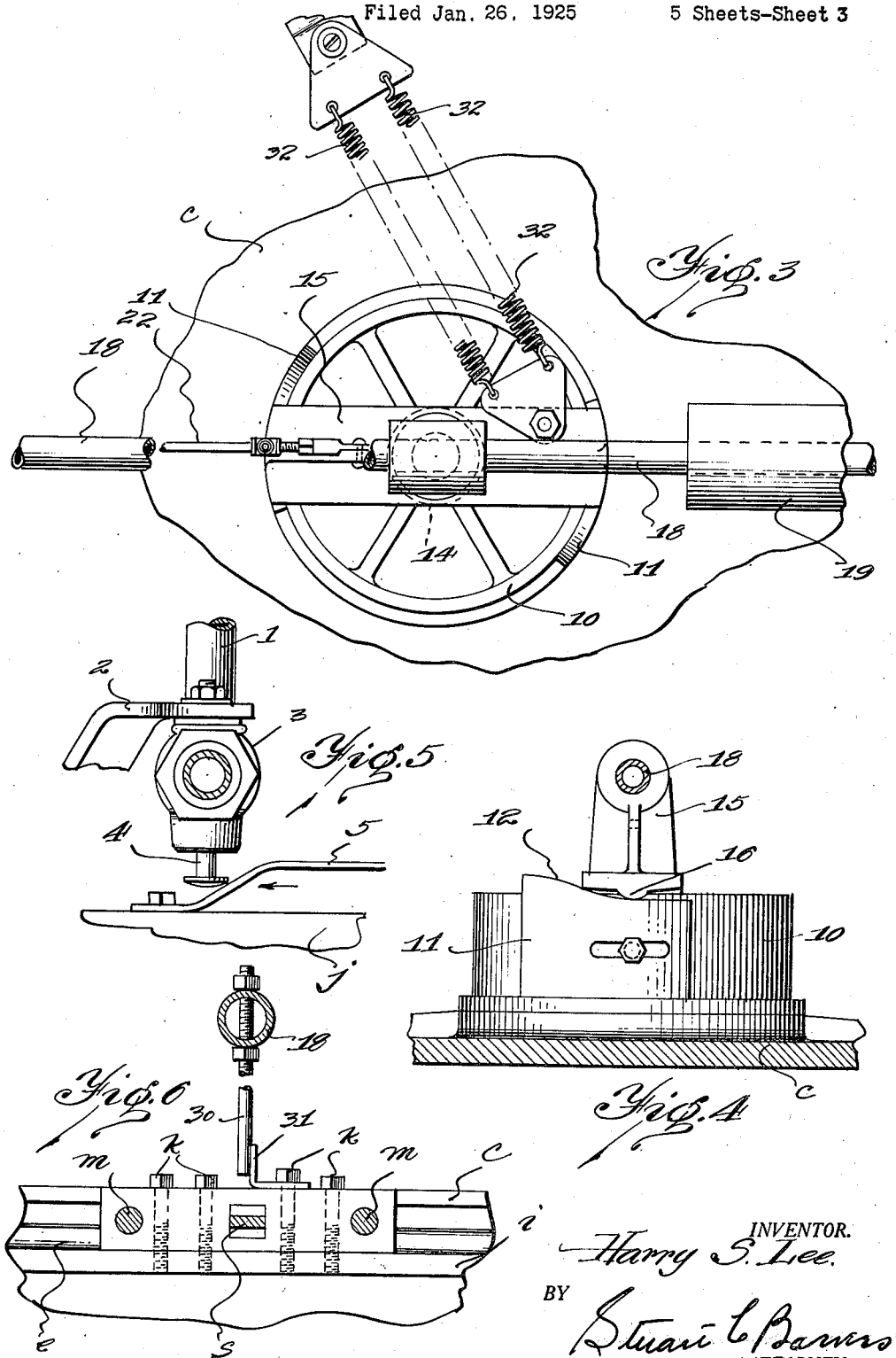

July 12, 1927.
H. S. LEE
MOLDING APPARATUS
Filed Jan. 26, 1925      5 Sheets-Sheet 4
1,635,369
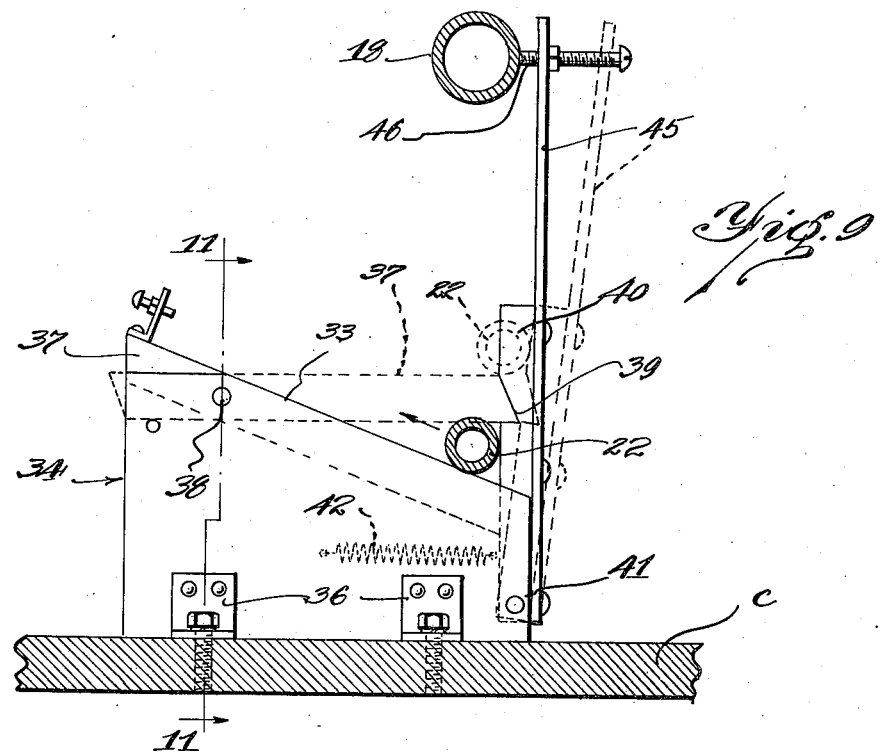
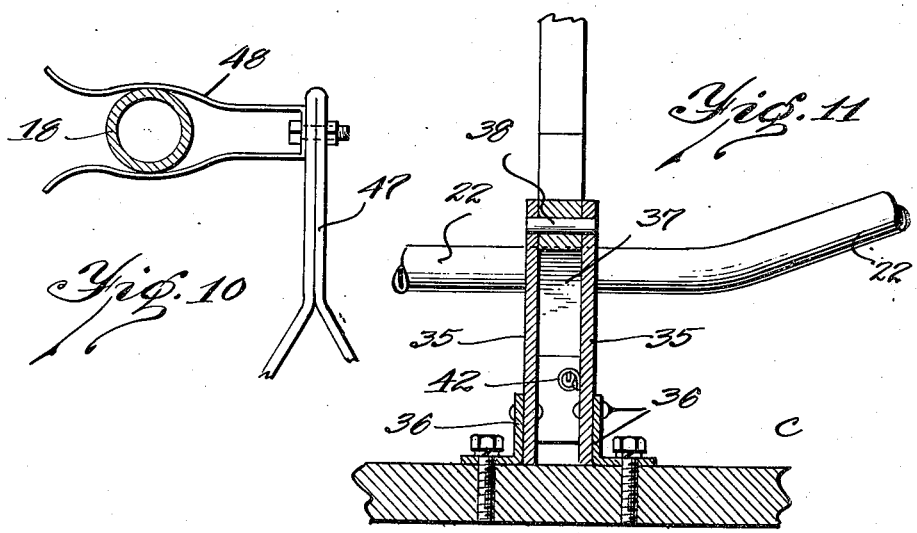
INVENTOR.
Harry S. Lee,
BY
Stuart C. Barnes
ATTORNEY.

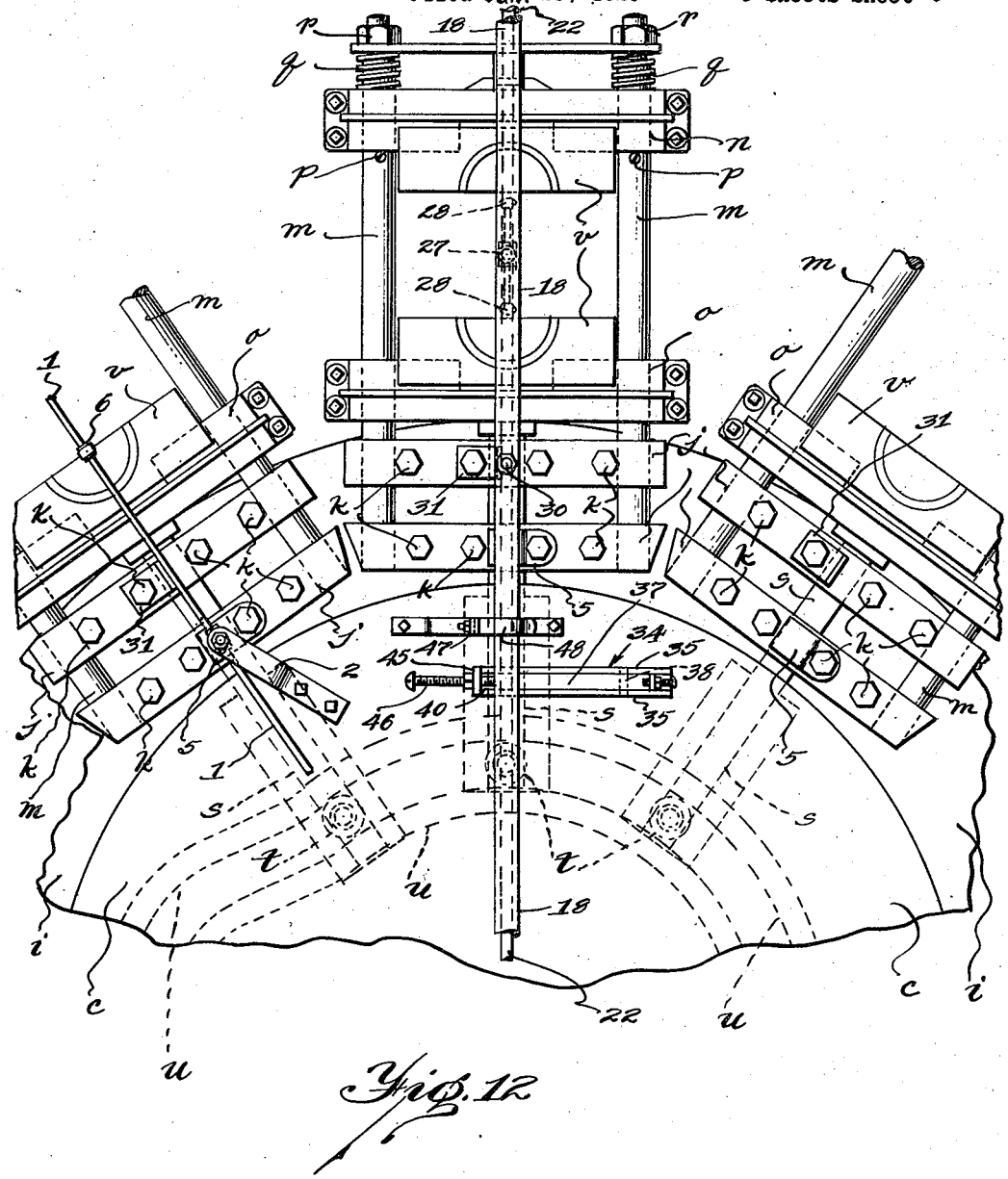

Patented July 12, 1927.

1,635,369

UNITED STATES PATENT OFFICE.

HARRY S. LEE, OF PLYMOUTH, MICHIGAN.

MOLDING APPARATUS.

Application filed January 26, 1925. Serial No. 4,744.

This invention relates to semi-automatic molding apparatus. It is designed more particularly for casting operations where permanent molds are intended to make ferrous castings, but obviously it has a wider application and consequently the claims are not to be construed as so limited.

It is the object of the invention to provide an automatic coveyor, preferbaly in the form of a rotating table, which successively opens the mold sections, discharges an air blast into the sections to clean them, and applies a film of carbon to the inside of the mold as a parting and insulating medium. The conveyor continues on past a core-loading position; then the mold sections automatically close and pass a pouring zone; they are then conveyed for a distance calculated to give them a preliminary cooling; then they pass to a position where the mold sections automatically open and discharge the core and the casting; then the next cycle of operation is repeated in precisely the same way. This rotating table (if the conveyor means takes this form) is capable of handling a large number of molds at one time.

One of the specific features of this apparatus is the automatic means for applying the carbon to the mold sections. This part of the apparatus works automatically to drop the carbon-applying flame into the mold and then raise the same at a graduated speed so as to evenly and nicely apply the carbon film to the mold. These features will be more fully explained hereinafter.

In the drawings:

Fig. 2 is a vertical section through the machine, taken on the line 2—2 of Fig. 1.

Fig. 3 is an enlarged plan view of a portion of the machine, showing some of the mechanism for controlling the movement of the carbon-applying mechanism.

Fig. 4 is a detail section taken on the line 4—4 of Fig. 2, showing the cam for raising the swinging bar carrying the carbon-applying mechanism.

Fig. 5 is a section on the line 5—5 of Fig. 1, showing the means for controlling the air blast.

Fig. 6 is a section on the line 6—6 of Fig. 1, showing the trip for moving the arm which carries the carbon-applying mechanism.

Fig. 7 is a detail showing how the fan-shaped flame is applied to the molds.

Fig. 8 is a section on the line 8—8 of Fig. 2.

Fig. 9 is a section on the line 9—9 of Fig. 2, showing the means for raising the flame.

Fig. 10 is a section on the line 10—10 of Fig. 2.

Fig. 11 is a section on the line 11—11 of Fig. 9.

Fig. 12 is a fragmentary plan view, being an enlargement in part of Fig. 1.

Figure 1:
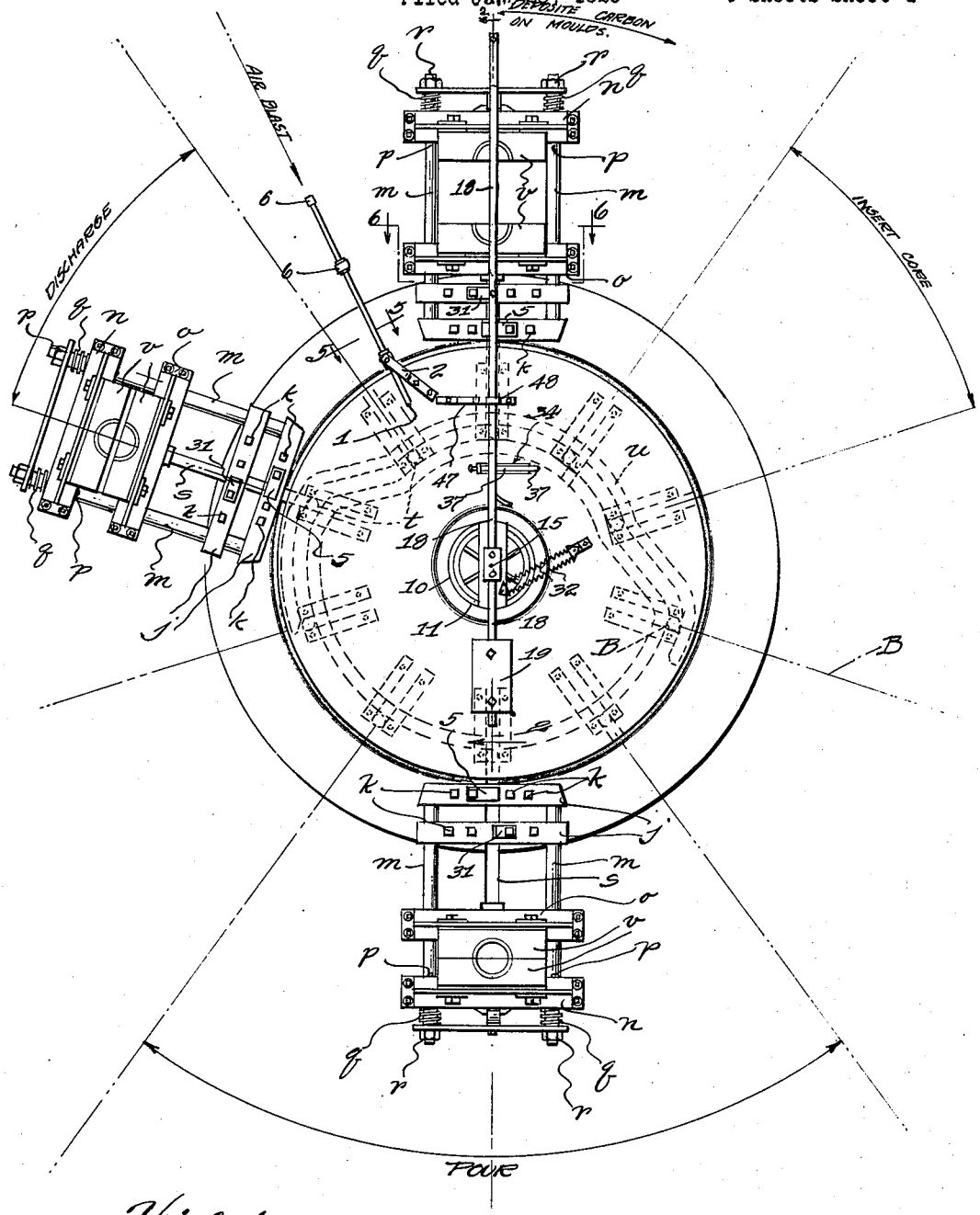
Fig. 1 is a plan view of the machine with some of the molds removed.

$a$ designates a support which is securely anchored to the floor, and which is provided with a vertical extending hub $b$. A plate or table $c$ is secured to the top of this hub by means of the screws $d$, or other fastening devices. Obviously the table $c$ is stationary. Rotatably supported about the hub $b$ is a large rotating platform $e$, to which is secured the large ring gear $f$. A worm $g$ meshes with this ring gear and is driven by the shaft $h$, which is connected to any suitable source of power.

This rotating platform is dipped down as at $i$, near its periphery and bearing blocks $j$ are bolted to this rotating platform by means of the bolts $k$. A pair of guide arms $m$ are carried by these bearing blocks and are arranged to support the mold carriers $n$ and $o$, the mold carrier $n$ being carried at the outer end and limited in its inward movement by the pin $p$ (Fig. 1), the springs $q$ yieldingly forcing this carrier against the pin, but permitting a slight movement outwardly of the carrier against the tension of the spring. Adjusting nuts $r$ are carried on the end of the guide rods for adjusting the compression of the spring bearing against the mold carrier $n$. The other mold carrier $o$ is slidable on said guide rods and has secured thereto an inwardly extending arm $s$, which is provided at its inner end with a roller $t$. Secured to the underside of the stationary table $c$ is a continuous cam $u$ in which the roller $t$ engages. Fig. 1 shows the shape of the cam, and it is plainly evident that as the rotating table is revolved, the arm $s$ is reciprocated, carrying with it the mold carrier $o$ for the purpose of bringing the molds $v$ carried by said carriers together, and separating them.

At one stage of the operation it will be noticed from observing Fig. 1 that the molds are separated, thereby permitting the operator or attendant to insert a core in the mold, whereupon the cam closes the molds as at B, in Fig. 1. The table continues to revolve and the next step in the operation is the pouring of the molten metal into the mold. The next stage in the operation is the partial cooling of the molten metal so that the casting will harden just sufficiently to hold its shape when ejected from the mold. This cooling of the casting while in the permanent mold will only slightly chill the casting; in fact, there will be only an infinitesimal portion chilled, and when the casting is discharged from the mold, it may be introduced into an annealing bath, which positively excludes all oxygen and prevents any further chilling. Due to the fact that the temperature of the interior of the casting or the center mass is so high and there is only a very small portion of the casting which is chilled, compared to the mass of the casting, the internal heat of the casting will, when dropped into the annealing bath, immediately raise the temperature of the chilled portion of the casting and remove the chill.

As the table continues to revolve, it will be noticed in Fig. 1 that the cam separates the molds first at a very slow rate, and then faster as the inclination of the cam increases. This will permit the casting and core to drop out of the mold. If necessary, a knock-out can be used for positively ejecting the casting from the molding.

The molds now remain separated for a certain period of time, and during this time there are several operations which are performed on the mold, viz: the molds are cleaned by an air blast, and then a coat of carbon is deposited on the mold which serves as a parting material so that the casting will not stick to the mold.

Refer to Figs. 1 and 5. An air line 1 is led to the machine and a bracket 2 secured to the stationary table c supports this line, which is provided with a valve 3 having a control stem or plunger 4 which may be raised by the cam 5, secured to any suitable part of the moving or revolving table e. In Fig. 5, it will be seen how the cam 5 is moved in the direction of the arrow, thereby raising the plunger 4 for opening the valve, and permitting the air to be shot in the mold. This air blast removes any particles of dust or sand which might remain in the mold after the casting has been dumped out. Preferably, the cams 5 are carried on the bearing blocks j and are so located as to open the valves when the molds pass under the nozzles 6, at the extremity of the air line.

The next step in the preparation of the mold for receiving the molten metal is the depositing of an even film of carbon on the surface of the mold.

Bolted to the stationary table c at the center is a support 10. This support is made of a special casting and has adjustably secured thereto the cams 11 (Fig. 4) which are provided with an inclined cam surface 12 for a purpose later to be described. The support 10 is provided with a bearing 13 at the center, which receives the short shaft or heavy pin 14, which is pinned or otherwise secured to the rotating hub 15, formed of a casting. It will be seen that this hub 15 is rotatably supported on the support 10, as well as being permitted to have relative sliding movement therewith.

The hub 15 is provided with the overhanging flanges 16 which are adapted to engage the cam surface 12. Secured to the hub by means of the set screws 17 is a long bar 18 having a counterweight 19 on the end, the other end extending beyond the outer periphery of the machine. Pivoted to said hub 15, as at 20, is a coupling 21, to which is secured the gas pipe 22. This gas pipe is connected to a main 23 by means of the flexible hose coupling 24. This gas pipe 22 extends toward the outer periphery of the machine, substantially parallel to the bar 18. The extreme end of the gas pipe being threaded into a forked fixture 25, and the rod 26 which is adjustably secured to the bar 18, is arranged to pass down through the forked fixture 25 and the coil spring 26 yieldingly bears against the fixture 25 so as to act as a bumper when the gas pipe drops to lower the T connection 27, which carries the burner tips 28 between the molds when the same are separated, as shown in Fig. 2. This gas pipe and connections are allowed to fall between the molds by gravity, in a way later to be described.

A depending trip rod 30 is adjustably secured to the bar 18 and is projected downwardly so that the same will be engaged by the L-shaped trip 31, carried on one of the bearing blocks j, secured to the rotating table. Now, as this table is revolved, this trip 31 engages the rod 30 and swings the bar 18 slowly around in a clockwise direction, as viewed in Fig. 1. This carries with it the gas pipe 22, and also rotates the hub 15. The rotation of the hub 15 is resisted by the pair of coil springs 32 (see Fig. 9). As the gas pipe is swung around, the same will slide up the inclined cam surface 33 on a standard 34. This standard is formed of two plates 35 (Fig. 11) which are secured to the table c by means of the brackets 36, which are bolted to the table. Pivotally mounted between these plates 35 is a rocking leg 37. As this gas pipe moves past the pivot 38 which supports the rocking leg, it will be noticed that the leg may be rocked to a horizontal position, thereby permitting one end of the leg to snap into the notch 39 carried by the latch bar 40. This bar 40 is pivoted to the side plates as at 41, and the spring 42 yieldingly holds the same in engagement with the rocking leg. As the gas pipe overrides the pivot 38, it has been raised sufficiently so as to raise the depending burner tips high enough to clear the guide rods m. which support the mold carriers. This swinging movement of the gas pipe 22 and the bar 18, and also the hub 15, cause the overhanging flange of the hub to ride on the cam 12, thereby raising the bar 18, and raising the depending rod 30 carried by the bar out of engagement with the trip 31. This is so timed that the rod is disengaged from the trip when the gas pipe has moved past the pivot 38, supporting the rocking leg 37. At this point, the trip 31 passes the rod 30 and ceases to move the bar 18, thereby allowing the springs 32 to return the bar 18 and mechanism carried thereby back to the original position. As the rocking leg 37 is engaged in a notch 39, the gas pipe 22 is carried back to its original position in a horizontal plane and strikes the latch 40, which, as shown by the dotted lines in Fig. 9, will rock the latch 40 against the tension of a spring 42 and thereby release the leg so that the gas pipe and leg may drop to the full line position as shown in Fig. 9.

Secured to the back of the latch 40 is a vertical standard 45, which is provided with an adjustable stop 46 against which the bar 18 strikes when it returns to its original position. The latch is tripped by the gas pipe 22 and the bar 18 striking the latch. The counterweight secured to bar 18 insures the tripping of the latch as the weight of the moving counterweight, which is considerable, is available for such tripping action. This is so timed that it will drop the burner into the following pair of molds, whereby the next trip 31 carried by the following set of mold supports engages the depending rod 30, and again moves the bar 18 and mechanism carried thereby for repeating this operation.

The advantage of moving this fan-shaped flame vertically in the molds is that the molds are evenly coated with a thin film of carbon. The present method of coating molds with a coat of carbon is to pass the molds by a large mass of flame, the incomplete combustion of the flame depositing a coat of carbon on the molds. However, this is rather unsatisfactory, as the carbon is very often deposited unevenly, thereby making an uneven casting. My method and apparatus for depositing this carbon by a fan-shaped flame passed along the mold at a uniform rate of speed deposits the carbon evenly, and avoids irregularities in the casting.

Carried by the table is a standard 47, provided with a forked spring clip 48, into which the bar 18 fits when it returns to its original position, thereby preventing any rebound of the mechanism as the same is returned with considerable speed, due to the tension of the springs 32.

The springs $q$ which bear against the mold carrier $n$ also serve as means for self-aligning the molds so that they will always meet along their entire length. Were it not for these equalizing springs, when one of the molds became worn, it would not be possible for the same to come together tight enough to prevent leakage of the molten metal. There is provided sufficient clearance between the guide rods and the mold carrier $n$ so as to allow a small rocking movement of the mold carrier so that the springs may properly function to press the molds tightly together along their entire length.

The cores are built of sand and are provided with annular ribs on their sides at the top. These ribs fit into the grooves in the mold sections and support the cores in the mold. Obviously the half section of mold can support a core thrust into it until the other section is closed upon it.

To recapitulate, this apparatus is capable of automatically opening the mold sections, then automatically cleaning the same by tripping the air blast, then automatically dropping the carbon-applying flame which is then gradually raised to apply a thin film of carbon. The apparatus then presents the open mold to the core-handling operator, who inserts the core; the cam then automatically closes the mold and finally, the apparatus runs through the zone wherein the pouring operation may be performed either with hand ladles or any suitably supported receptacle for the molten metal. After the pouring operation, the table rotates a considerable distance, which permits the casting to cool before the cam again opens the casting and it either drops out of its own weight or it can be knocked out.

It will be understood that these mold sections are properly treated to make a practical, permanent mold which can handle ferrous castings. This may be done by coating with suitable material, such as powdered fire clay and silicate of soda, kieselguhr and silicate of soda, or they may be impregnated with a zinc compound. This permits the mold sections to be used a large number of times before they deteriorate so that they cannot be further used, and also has a very important part in preventing the chilling of the casting.

What I claim is:

1. In a molding apparatus, the combination of a conveyor for supporting mold sections, a pipe provided with means at its end for affording a carbon-generating flame, and means for dropping the pipe into the mold sections when the conveyor brings the same to the pipe and for gradually withdrawing the end of the pipe therefrom, including a bar for affording a support for the pipe but permitting a limited relative movement thereto, said bar and pipe being carried along in a limited movement by the conveyor, cam means for raising the pipe gradually to distribute the carbon evenly over the mold, and cam means for also causing the bar to raise to dis-establish the connection between the conveyor and the bar.

2. In a molding apparatus, the combination of a conveyor for supporting mold sections, a pipe line provided with means at its end for affording a carbon-generating flame, and means for dropping the pipe into the mold sections when the conveyor brings the same to the pipe and for gradually withdrawing the end of the pipe therefrom, including a bar for affording a support for the pipe, said bar and pipe being carried along in a limited movement by the conveyor, cam means for raising the pipe gradually to distribute the carbon evenly over the mold, and for also causing the bar to raise to dis-establish the connection between the conveyor and the bar, and a rocking member actuated when said members have ridden over the cam means for the purpose of returning the said members to their initial position while they are elevated.

3. In a molding apparatus, the combination of a conveyor for molds, a burner for playing a flame on the molds, a support for the burner, means for moving the support to cause the burner to travel with a mold, and means for moving the burner relative to its support during the movement of the support whereby the burner traverses the interior surface of the mold.

4. In a molding apparaus, the combination of a conveyor for molds, a burner for playing a flame on the molds, a support for the burner, means for moving the support to cause the burner to travel with a mold, means for moving the burner relative to its support during the movement of the support whereby the burner traverses the interior surface of the mold, and means for returning the support to its first position after the burner has traversed the surface of the mold.

5. In a molding apparatus, the combination of a conveyor for molds, a burner for playing a flame on the molds, a support for the burner, means for moving the support to cause the burner to travel with a mold, means for moving the burner relative to its support during the movement of the support whereby the burner traverses the interior surface of the mold, positive means for returning the support to its first position after the burner has traversed the surface of the mold, and means for engaging the support after this return movement to prevent rebound.

6. In a molding apparatus, the combination of a table for conveying molds, means for closing and opening the molds whereby molten metal is received, molded and discharged, a nozzle positioned in the path of the molds for playing a blast of air against the interior of the molds after a molded article is discharged, and a burner positioned at another point in the path of the molds and movable in the direction of movement of the molds for playing a carbon depositing flame upon the interior surface of the molds.

7. In a molding apparatus, the combination of a table for moving permanent molds in a path, means for closing and opening the molds in their path of travel to receive molten metal and discharge the molded forms, a nozzle in the path of the molds adjacent the discharge place for playing a blast of air against the molds, valve means operable from the table to control the flow of air through the nozzle, and a movable burner positioned at another point in the path of the molds for depositing a layer of carbon on the interior of the molds.

In testimony whereof I have affixed my signature.

HARRY S. LEE.